United States Patent Office 2,921,946
Patented Jan. 19, 1960

2,921,946

STEROIDAL 17(20)-ENOL ACETATES AND PROCESSES FOR PREPARING THE SAME

George R. Krsek, Danville, Pa., assignor to Merck & Co., Inc., Rahway, N.J., a corporation of New Jersey No Drawing. Application September 30, 1954
Serial No. 459,549

3 Claims. (Cl. 260—397.45)

This invention relates to the new chemical compound crystalline $3\alpha,20$-diacetoxy-$\Delta^{17(20)}$-pregnene-11-one and to processes for preparing the same.

The new chemical compound with which this invention is concerned, crystalline $3\alpha,20$-diacetoxy-$\Delta^{17(20)}$-pregnene-11-one, is a useful intermediate in the production of cortisone. Thus by methods known in the art, crystalline $3\alpha,20$-diacetoxy-$\Delta^{17(20)}$-pregnene-11-one can be converted to cortisone by chemical reactions designed to (1) introduce a 17-hydroxyl group in the "natural" or $\alpha$ configuration, (2) introduce an esterified hydroxyl group at carbon 21, (3) convert the 3-hydroxy to a 3-keto group, and (4) introduce a double bond between carbons 4 and 5. Thus $3\alpha,20$-diacetoxy-$\Delta^{17(20)}$-pregnene-11-one is converted to $3\alpha,20$ diacetoxy-17(20) epoxy-pregnene-11-one by treatment with perphthalic acid dissolved in an organic solvent. Hydrolysis of the epoxide with sodium hydroxide solution at room temperature produces pregnane-$3\alpha,17\alpha$-diol-11,20-dione. This compound is brominated in chloroform to produce the corresponding 21-bromo compound, 21-bromo-pregnane-$3\alpha,17\alpha$-diol-11,20-dione. Treatment of the 21-bromo compound with sodium iodide and potassium acetate in acetone yields pregnane-$3\alpha,17\alpha,21$-triol-11,20-dione,21-acetate which may be oxidized to the corresponding 3-keto compound by treatment with an excess of N-bromsuccinimide. Bromination of this 3-keto compound produces 4-bromo-pregnane-$17\alpha,21$-diol-3,11,20-trione,21-acetate. This compound by reaction with semicarbazide hydrochloride is converted to the 3-semicarbazone of cortisone acetate which may be hydrolyzed to cortisone acetate by treatment with a mixture of aqueous pyruvic and acetic acids.

In preparing the novel chemical compounds of this invention $3\alpha$-acetoxy-pregnane-11,20-dione which can be represented by the following structural formula:

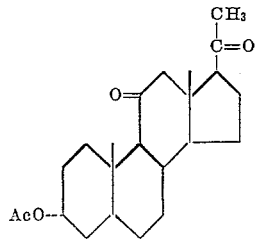

is reacted with acetic anhydride in the presence of an acid catalyst to form $3\alpha,20$-diacetoxy-$\Delta^{17(20)}$-pregnene-11-one which has the formula:

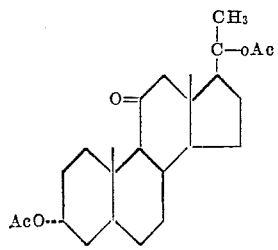

Acid catalysts which can be employed in this reaction include p-toluenesulfonic acid, dinitrobenzene sulfonic acid, and perchloric acid.

The $3\alpha,20$-diacetoxy-$\Delta^{17(20)}$-pregnene-11-one thus obtained is an impure amorphous compound.

Purification and crystallization of this compound is accomplished by contacting a petroleum ether solution of $3\alpha,20$-diacetoxy-$\Delta^{17(20)}$-pregnene-11-one with an adsorbent such as silica gel and eluting the adsorbate with chloroform. The crystalline form of $3\alpha,20$-diacetoxy-$\Delta^{17(20)}$-pregnene-11-one is precipitated from methyl alcohol solution. Alternatively, the $3\alpha,20$-diacetoxy-$\Delta^{17(20)}$-pregnene-11-one can be isolated directly by crystallization from methyl alcohol.

In accordance with the process of the present invention a mixture of $3\alpha$-acetoxy-pregnane-11,20-dione, acetic anhydride and p-toluene sulfonic acid is prepared. The mixture is heated to between 60° and 100° C. for approximately from four to six hours with optimum results at temperatures of 94° to 98° C. The reaction mixture is then distilled under slightly reduced pressure to remove acetic acid and acetic anhydride. The residue is crude $3\alpha,20$-diacetoxy-$\Delta^{17(20)}$-pregnene-11-one.

Purification and crystallization of this crude $3\alpha,20$-diacetoxy-$\Delta^{17(20)}$-pregnene-11-one is accomplished by dissolving the crude product in benzene and washing with aqueous sodium bicarbonate solution to remove any remaining acidic impurities. The benzene is then removed by evaporation.

The residual $3\alpha,20$-diacetoxy-$\Delta^{17(20)}$-pregnene-11-one is dissolved in petroleum ether and contacted with silica gel, whereby the $3\alpha,20$-diacetoxy-$\Delta^{17(20)}$-pregnene-11-one is adsorbed on the silica gel. The $3\alpha,20$-diacetoxy-$\Delta^{17(20)}$-pregnene-11-one is then eluted with chloroform.

The chloroform eluate is concentrated in vacuo to a spongy amorphous solid. Crystallization of this material from methyl alcohol results in pure crystalline $3\alpha,20$-diacetoxy-$\Delta^{17(20)}$-pregnene-11-one, having a melting point of 128° C. and a specific rotation $[\alpha]_D^{25} = 58.7°$ in 2% chloroform.

The following examples are given by way of illustration and not of limitation:

Example 1

A mixture of ten grams of $3\alpha$-acetoxy-pregnane-11,20-dione, 1.5 grams of p-toluene sulfonic acid and 60 milliliters of acetic anhydride was prepared. The mixture was heated to approximately 90° C. for two hours and was then distilled under slightly reduced pressure to remove acetic acid and acetic anhydride. The residue was crude $3\alpha,20$-diacetoxy-$\Delta^{17(20)}$-pregnene-11-one.

The crude $3\alpha,20$-diacetoxy-$\Delta^{17(20)}$-pregnene-11-one was dissolved in benzene and washed with aqueous sodium bicarbonate solution to remove any remaining acidic impurities. The benzene solution was then concentrated in vacuo to remove the solvent.

The residual material, weighing 13.4 grams, was then dissolved in three liters of petroleum ether and subjected to chromatography in a silica gel adsorption column, thereby adsorbing the $3\alpha,20$-diacetoxy-$\Delta^{17(20)}$-pregnene-11-one on the silica gel. The column was eluted with chloroform.

The eluate was concentrated in vacuo to a spongy amorphous solid. Crystallization of this material from methyl alcohol gave a crystalline solid which softened at 70° C. and melted at 92–105° C. Upon recrystallization from methyl alcohol the material had a melting point of 120° C. Further recrystallization from hexane yielded substantially pure $3\alpha,20$-diacetoxy-$\Delta^{17(20)}$-pregnene-11-one, having a melting point of 128.5° C.

Example 2

A mixture of 100 grams of 3α-acetoxy-pregnane-11,20-dione, 15 grams of p-toluene sulfonic acid, and 500 cc. of acetic anhydride was prepared. The mixture was heated to approximately 94° C. for fifteen hours and was then distilled under slightly reduced pressure to remove acetic acid and acetic anhydride. The residue was crude 3α,20-diacetoxy-$\Delta^{17(20)}$-pregnene-11-one.

The crude 3α,20-diacetoxy-$\Delta^{17(20)}$-pregnene-11-one was dissolved in benzene acid washed with aqueous sodium bicarbonate solution to remove any remaining acidic impurities. The benzene solution was then concentrated in vacuo to remove the solvent.

The residual material was then dissolved in petroleum ether and subjected to chromatography in a silica gel adsorption column.

The 3α,20-diacetoxy-$\Delta^{17(20)}$-pregnene-11-one was eluted with chloroform and the yield of substantially pure 3α,20-diacetoxy-$\Delta^{17(20)}$-pregnene-11-one was 69 grams, having a melting point of 126–128° C. and a specific rotation $[\alpha]_D^{25} = 58.7°$ in a 2% chloroform solution.

Example 3

To a mixture of 300 grams of 3α-acetoxy-pregnane-11,20-dione and 1800 ml. of acetic anhydride was added 6 grams of 2,4-dinitrobenzene sulfonic acid at 26° C. The solution was agitated for six hours. Sodium acetate (12 grams) was then added to destroy excess acid and the excess acetic anhydride removed by distillation at reduced pressure. After concentration to dryness the crystalline 3α,20-diacetoxy-$\Delta^{17(20)}$-pregnene-11-one may be obtained by the methods employed in Examples 1 and 2. In this particular experiment the pregnene compound was converted to pregnene-3,17α-diol-11,20-dione by reaction with perbenzoic acid followed by alkaline hydrolysis. The over-all yield of final product was approximately 93%.

Any departure from the above description which conforms to the present invention is intended to be included within the scope of the claims.

What is claimed is:

1. The process which comprises reacting 3α-acetoxy-pregnane-11,20-dione with acetic anhydride in p-toluene sulfonic acid at a temperature below 100° C., recovering 3α,20-diacetoxy-$\Delta^{17(20)}$-pregnene-11-one, dissolving 3α,20-diacetoxy-$\Delta^{17(20)}$-pregnene-11-one in petroleum ether, passing said petroleum ether solution of 3α,20-diacetoxy-$\Delta^{17(20)}$-pregnene-11-one through a column of silica gel, eluting the adsorbed 3α,20-diacetoxy-$\Delta^{17(20)}$-pregnene-11-one from the silica gel by passing a solution of chloroform through the column, removing the chloroform, adding methyl alcohol thereby crystallizing 3α,20-diacetoxy-$\Delta^{17(20)}$-pregnene-11-one from solution.

2. The process which comprises reacting 3α-acetoxy-pregnane-11,20-dione with acetic anhydride in the presence of 2,4-dinitrobenzene sulfonic acid at a temperature below 100° C. to produce 3α,20-diacetoxy-$\Delta^{17(20)}$-pregnene-11-one.

3. The process which comprises reacting 3α-acetoxy-pregnane-11,20-dione with acetic anhydride in the presence of p-toluene sulfonic acid at a temperature below 100° C. to produce 3α,20-diacetoxy-$\Delta^{17(20)}$-pregnene-11-one.

References Cited in the file of this patent

UNITED STATES PATENTS

| | | |
|---|---|---|
| 2,666,072 | Hanze et al. | Jan. 12, 1954 |
| 2,677,695 | Oliveto | May 4, 1954 |
| 2,694,078 | Ott | Nov. 9, 1954 |
| 2,705,233 | Julian | Mar. 29, 1955 |
| 2,751,398 | Hunt et al. | June 19, 1956 |
| 2,786,856 | Cutler et al. | Mar. 26, 1957 |